United States Patent Office 3,429,210
Patented Feb. 25, 1969

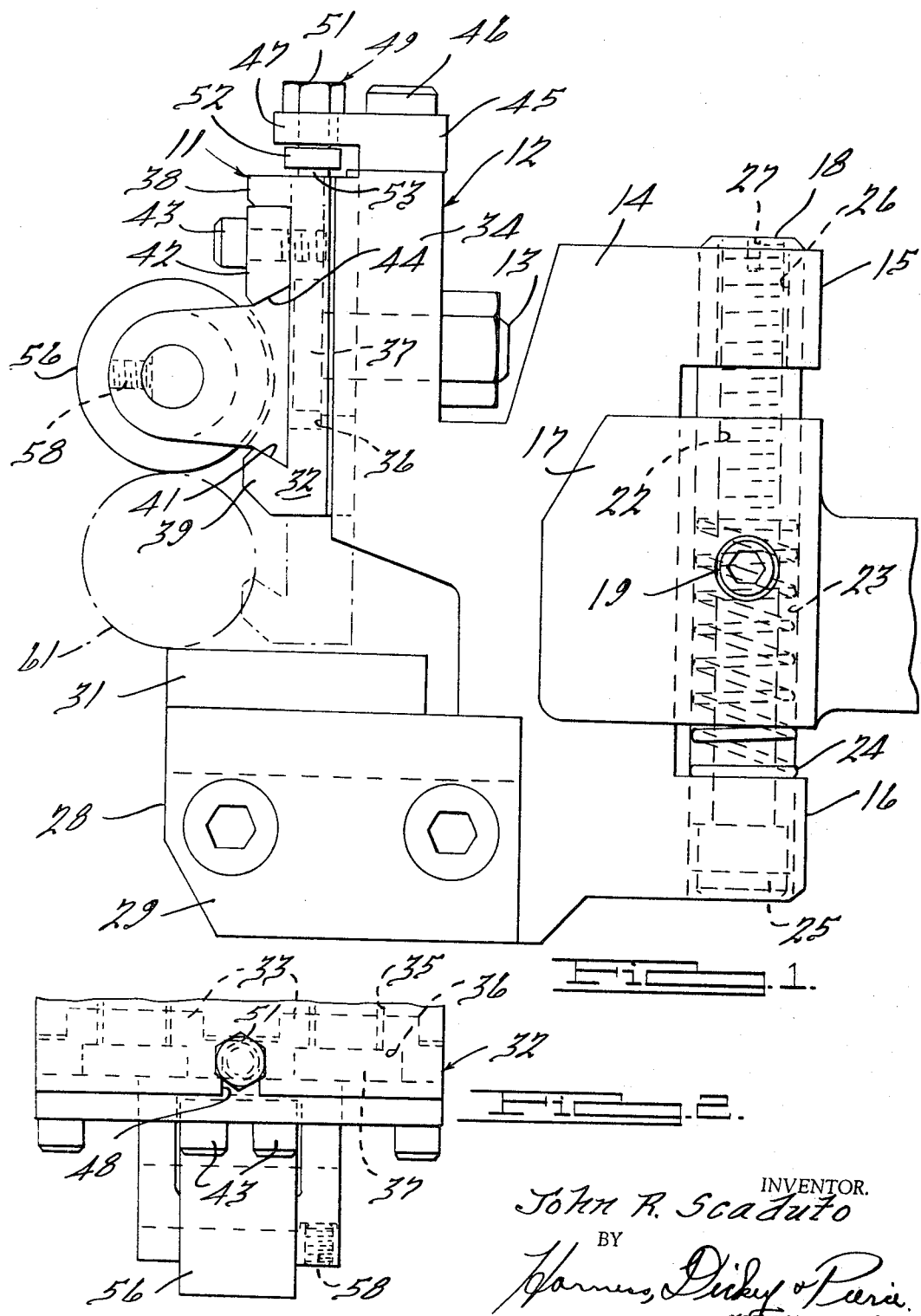

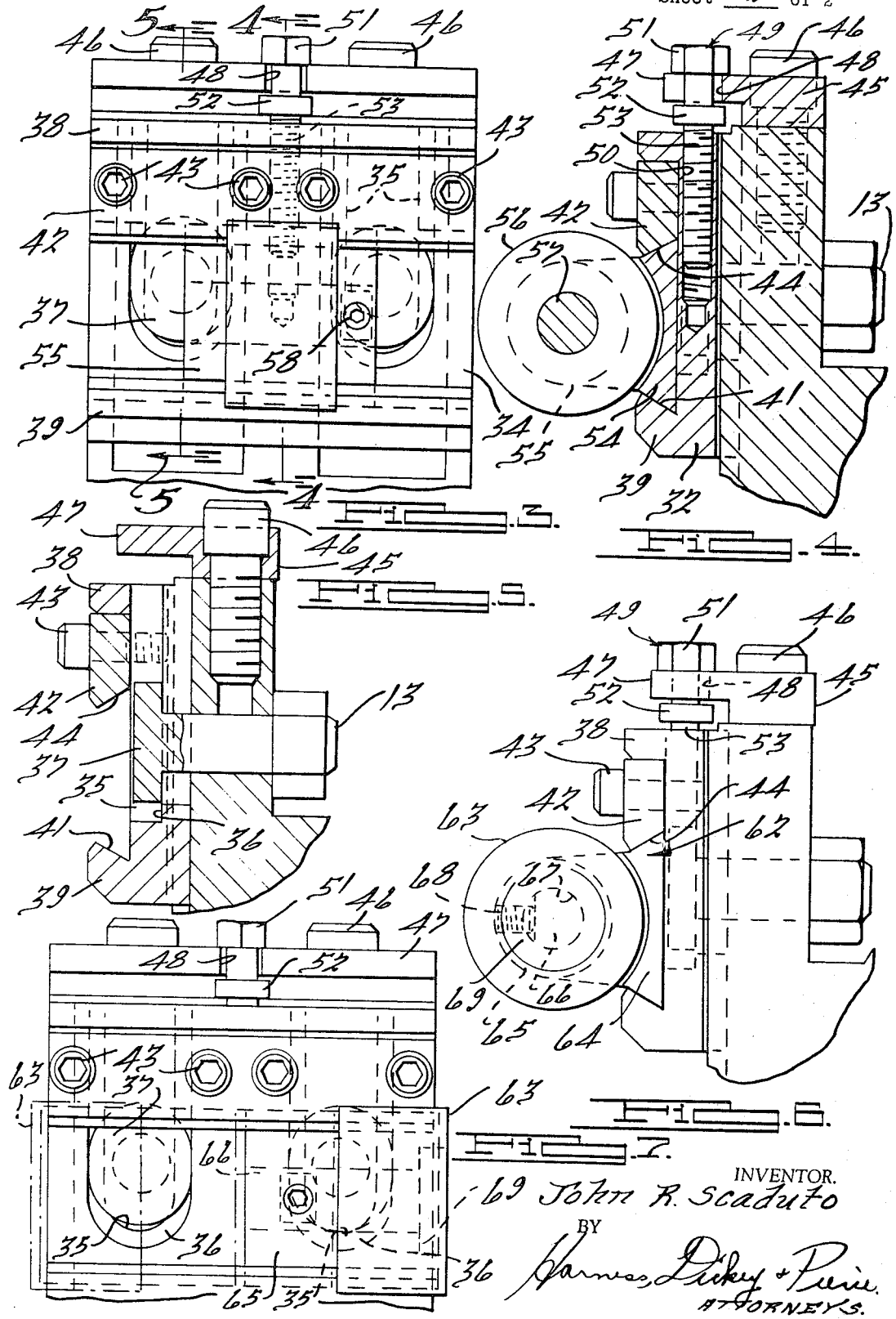

3,429,210
SHAVING TOOL
John Richard Scaduto, 14460 E. State Fair,
Detroit, Mich. 48205
Filed Mar. 16, 1967, Ser. No. 623,590
U.S. Cl. 82—35                                      5 Claims
Int. Cl. B23b 29/10

ABSTRACT OF THE DISCLOSURE

The invention pertains to a backup roller for a shaving tool holder which is adjustable laterally across the face of the holder to be located in a position at which backup pressure is desired. The laterally adjustable roller employed on the holder is utilized for shaving a screw machine part. One or a plurality of the holders are moved simultaneously or seriatim into engagement with a rotating screw machine part for performing an operation thereon.

---

This invention relates to shaving tools and holders therefor and particularly to a shaving tool holder having a laterally adjustable backup roller thereon.

Background of the invention

A holder similar to that of the present invention was illustrated and described in a claim in the patent to Schlitters, No. 2,364,320, issued Dec. 5, 1944 and now expired. In this patent the backup roller is mountable in three different positions on the holder requiring the removal and replacement thereof. Special supporting elements must be employed if rollers are to be otherwise mounted on the holder. In the present construction, the supporting element for the roller is shifted laterally to any position on the holder.

Summary of the invention

This invention pertains to a holder for a backup roller and a shaving tool which are so related as to produce a shaving operation as the work is revolved with a predetermined pressure provided by the holder. The backup roller must be precisely mounted relative to the shaving tool and the roller is so mounted on the holder as to be adjustable to any position laterally across the face thereof above the cutting edge of the tool. This eliminates a large number of rollers and supporting elements therefor and permits the adjustment of the roller to any position in a minimum of time.

Brief description of the drawings

FIG. 1 is a broken view in elevation of a shaving tool holder with a laterally adjustable backup roller embodying features of the present invention;

FIG. 2 is a broken plan view of the laterally adjustable roller and the holder illustrated in FIG. 1;

FIG. 3 is a view in front elevation of the laterally adjustable backup roller, as viewed from the left-hand side of FIG. 1;

FIG. 4 is a sectional view of the structure illustrated in FIG. 3, taken on the line 4—4 thereof;

FIG. 5 is a sectional view of the structure illustrated in FIG. 3, taken on the line 5—5 thereof;

FIG. 6 is a view of structure, similarly illustrated in FIG. 4, showing another form thereof, and FIG. 7 is a view of the structure illustrated in FIG. 6, as viewed from the left-hand side thereof.

Description of the preferred embodiment

A dovetail supporting device 11 is attached to a vertically movable member 12 of a tool holder by a pair of clamping bolts 13. The member 12 has a rearwardly extending C-shaped portion 14 providing an upper flange 15 and a lower flange 16. A U-shaped head 17 telescopes with the C-shaped portion 14 and supports a pair of spaced pins 18 which are fixed to the head 17 by being press fitted therein or by screws 19 or both. This permits the up and down movement of the portion 14 relative to the head 17 on the ends of the pins 15. The head 17 has an extending arbor 21 by which it is secured to a supporting block (not shown). A threaded aperture 22 is provided in the upper portion of the head 17 centrally between the pins 18 having an enlarged bottom portion 23 containing a spring 24 which rests upon the upper face of the flange 16. A screw 25 extends through an aperture in the flange 16 within the spring in the aperture 23 and is screwed within the threaded aperture 22 to extend within an aperture 26 in the flange 15. The upper end of the screw is provided with a screw driver slot 27 so as to permit the screw to be adjusted either by a tool receiving recess within the head 25 or by the slot 27 in the upper end of the screw. In this manner the spring may be adjusted to provide a proper degree of resistance to the upward movement of the member 12. The member 12 has a forwardly extending portion 28 containing a dovetail flange at one side and a clamping dovetail plate 29 at the other side by which the dovetail on the bottom of the shaving tool 31 is fixed to the member 12. The structure so far described is similar to that to be found in the aforementioned patent.

The dovetail supporting device 11 embodies a plate 32 having spaced rearwardly extending portions 33 which mate with the face of the upstanding portion 34 of the member 12. A pair of spaced vertical slots 35 are provided in the rear wall of the plate 32 from the top thereof having a ledge 36 at the sides and bottom to receive the elongated heads 37 of the bolts 13 which prevent the rotation thereof in the slots. A forwardly extending flange 38 is provided at the top of the plate 32 and a flange 39 at the bottom has an inwardly sloping face 41 forming part of a dovetail clamp. A block 42 is secured to the plate 32 by a plurality of screws 43 having a sloping face 44 which forms the top portion of the dovetail clamp. At the top of the upstanding portion 34 of the member 12, a plate 45 is secured by a pair of screws 46. The plate has an extending flange 47 containing a slot 48 extending inwardly from the forward edge in which the body portion of a screw 49 between a head 51 and collar 52 extends. The head and collar prevents the screw 49 from moving lengthwise of the flange 47 when the head 51 is rotated. The extending body 53 of the screw 49 is secured within a threaded aperture 50 in the plate 32 by which the plate is adjusted to different vertical positions on the portion 34 of the member 12 and clamped by the pair of bolts 13 in firm fixed relation on the member.

The dovetail formed by the flange 39 and the block 42 clamps a dovetail portion of a member 54 which has forwardly extending spaced arms 55 between which a backup roller 56 is supported on a shaft 57. The shaft is retained in fixed position in an aperture in the arms by a set screw 58 extending through one end of an arm, as illustrated in FIG. 3. By loosening the screws 43 and releasing the block 42, the dovetail portion of the member 54 may be adjusted laterally on the plate 32, after which the tightening of the screws 43 retains the dovetail in adjusted position. By loosening the nuts on the bolts 13 and rotating the head 51 of the screw 49, the plate 32 may be adjusted vertically on the portion 34 of the member 12 to locate the roller vertically relative to the shaving edge of the tool 31. Thereafter, the nuts on the bolts 13 are tightened to fix the plate 32 on the member 12. When the member 12 is in retracted position relative to the workpiece, the roller 56 and member 12 are moved down by the spring 24 until the flange 15 strikes the head 17. As the member 12 is advanced toward the rotating workpiece 61, the roller will engage the workpiece and be moved upwardly against the pressure of the spring 24 as the shaving end of the cutter 31 advances into engagement with the work. By the time the roller reaches center position the shaving operation will be completed and the member 12 is thereafter retracted.

Referring to FIGS. 6 and 7, an outboard holder 62 for a roller 63 is illustrated. The holder has a dovetail base 64 and a single extending arm 65. A pin 66 is locked in an aperture 67 in the arm by a set screw 68. The opposite end of the pin head 69 thereon is recsesed within the roller. With this arangement, the roller 63 may be adjusted to any outboard position and is herein illustrated as extending to the right-hand side of the arm 65. The roller is illustrated in dot and dash line in outboard position on the left-hand side of the arm after the holder has been inverted. With this arrangement, a holder having an outboard roller is employed for either right-hand or left-hand outboard position adjustable to any position therebetween.

What is claimed is:

1. In a holder for a shaving tool having a spring pressed member, a plate supported on the front face of said member for vertical adjustment thereon, securing means engaging said plate for clamping the plate in adjusted position on the member, the front of the plate having a laterally disposed dovetail slot, and a roller supporting dovetail member adjustably secured in said slot.

2. In a holder for a shaving tool as recited in claim 1, wherein a releasable block forms part of the dovetail slot which secures the roller supporting member after the lateral adjustment thereof.

3. In a holder for a shaving tool as recited in claim 2, wherein the roller is located at one side of the supporting dovetail member to provide an outboard support therefor so constructed that by inverting the supporting member the roller will have the right and left-hand outboard positions.

4. In a holder for a shaving tool as recited in claim 1, wherein said plate has a right angle flange at one edge and a dovetail flange at the other edge, and a block forming a dovetail flange which is secured by screws to the plate in position to be backed up by said right angle flange.

5. In a holder for a shaving tool as recited in claim 4, wherein a second plate is secured to the top of the spring pressed member having a forwardly extending flange containing a slot, and a screw threaded in the plate having a head and spaced collar with the portion of the screw therebetween disposed in the slot in the second plate for adjusting the plate containing the dovetail slot vertically in either direction.

References Cited

UNITED STATES PATENTS

| | | | |
|---|---|---|---|
| 1,959,140 | 5/1934 | Peterson | 82—35 |
| 3,071,997 | 1/1963 | Schlitters | 82—35 |

LEONIDAS VLACHOS, *Primary Examiner.*